United States Patent [19]

Peck

[11] Patent Number: 4,841,802
[45] Date of Patent: * Jun. 27, 1989

[54] MODIFIED FAST FADE DRIVE AXLE HOUSING

[75] Inventor: David E. Peck, Rochester, Mich.

[73] Assignee: Rockwell International Corporation, Pittsburgh, Pa.

[*] Notice: The portion of the term of this patent subsequent to Aug. 2, 2005 has been disclaimed.

[21] Appl. No.: 845,144

[22] Filed: Mar. 27, 1986

[51] Int. Cl.⁴ .............................................. F16H 57/02
[52] U.S. Cl. .................... 74/607; 74/606 R; 228/169; 29/463
[58] Field of Search ............. 74/606 R, 607; 228/169, 228/170; 29/463

[56] References Cited

U.S. PATENT DOCUMENTS

| | | | |
|---|---|---|---|
| 1,410,758 | 3/1922 | Huff | 74/607 |
| 1,880,305 | 10/1932 | Williams | 74/607 |
| 1,945,076 | 1/1934 | Riemenschneider | 29/463 |
| 1,970,231 | 8/1934 | Habicht | 29/463 |
| 2,273,336 | 2/1942 | Spatta | 74/607 |
| 2,480,833 | 9/1949 | Buckendale | 74/607 |
| 2,674,783 | 4/1954 | Schneider et al. | 74/607 |
| 3,015,238 | 1/1962 | Williams | 74/607 |
| 3,213,531 | 10/1965 | Wylie | 74/607 |
| 3,269,214 | 8/1966 | Nagel | 74/607 |
| 3,535,002 | 10/1970 | Stamm | 74/607 |
| 3,673,888 | 7/1972 | Moll et al. | 74/607 |
| 4,068,541 | 1/1978 | Sakamoto et al. | 74/607 |

Primary Examiner—Richard E. Moore
Assistant Examiner—Vinh Luong

[57] ABSTRACT

A modified fast fade rear axle housing of rectangular cross-section having a shortened neck shape to maximize the torsional strength of the housing in the expanded annular section where the transition zone joins the center differential receiving portion and the beam arms of the axle. Two U sections are welded after being bent to provide parallel legs joined to a web by arcuate corner sections. The axially extending curvature of the corner sections and the web are respectively convexly defined by a first radius $R_1$ measured from a true origin at the vertical axis of the differential receiving portion where it intersects the longitudinal axis of the axle and a second eccentric radius $R_2$ measured from a displaced origin and concavely by blending radii $R_4$ and $R_3$ which are substantially less than corresponding blending radii in drive axle housings in which the convex curvature is concentric with the true origin. The blending radii and the eccentric radius values result in a shortened taper in the transitional zone which is about half that of a conventional slow fade taper wherein no eccentric radius is used.

3 Claims, 5 Drawing Sheets

LOCUS OF CORNER FORM RADIUS

PRIOR ART

MODIFIED FAST FADE DRIVE AXLE HOUSING

BACKGROUND OF THE INVENTION

Field of the Invention

The invention is in the field of heavy duty axle housings useful for large and heavy trucks in which a banjo housing is provided at or adjacent the center of the axle housing to accommodate the differential drive gears and laterally extending tubular members are formed in a rectangular cross-section to withstand torsional and vertical loading strains and stresses and to resist metal fatigue caused by pounding of the vehicle over rutted and potholed roads. The invention also lies in the field of manufacturing methods for axle housings using novel sheet steel material of uniform thickness.

DESCRIPTION OF THE PRIOR ART

Prior Manufacturing Methods—General

As pointed out in the patent to Riemenschneider, U.S. Pat. No. 1,945,076, rear axle housings for motor vehicles have been manufactured by various methods all of which require a careful selection of the starting stock material, special bending equipment and the employment of skilled operators. Generally, the prior methods contemplate stamping out blanks and shaping them by known bending methods into upper and lower halves of the axle housings which are welded together along longitudinal seams on each side to extend the full length of the housing. Such methods are expensive because a considerable percentage of the stock material is wasted due to the irregular outline of the blank and because of the excessive length of the weld.

The present methods which have been developed to overcome the problems noted in Riemenschneider are the hot forging methods such as those developed by Schneider et al, U.S. Pat. No. 2,674,783 which requires the use of expensive equipment dies and the services of skilled forging operators and welders, while at the same time requiring a blank having an irregular outline which is expensive because of the substantial waste of material.

Further, waste occurs not only in the material lost in cutting or stamping the blank but also takes place in forming the axle housing by hot forging and welding as for example in the Reimenschneider patent above-mentioned wherein a slotted tube is formed from strip stock, then heated and the end of the heated tub placed in a suitable female die to forcibly engage a complementary male die and thereby produce a predetermined upsetting of the blank which is enlarged by additional working to spread the upset. An additional step is required to outwardly weld a part thereof to form a frustoconical portion. That portion is then enlarged into an annular portion which is machined to a smooth finish and provides part of the housing for the axle. The added parts which are removed represent additional waste.

An additional example of a banjo-type drive axle housing having a very short tapered portion made by stamping of relatively thin sheet metal is found in U.S. Pat. No. 4,068,541 to Sakamoto et al. However, in the Sakamoto et al patent, the inner banjo shape adjacent the taper portion is reinforced by welding fixed partitions positioned to double the thickness in regions along the inside of the taper of the casing.

The present invention utilizes technology similar to the hot forming and bending technology of Schneider et al, U.S. Pat. No. 2,674,783 rather than stamping and internally reinforcing. The older efforts of stamping as well as the newer efforts of reinforcing a stamped banjo-shaped axle housing are to be distinguished from hot forming and bending operations which in accordance with the present invention are required to provide a faster fade in and adjacent to the transition zone between the differential receiving portion and the beam arms of the axle housing.

The Prior Art for the Blank

The prior patent to Schneider, et al, U.S. Pat. No. 2,674,783 shows a blank having an irregular outline which is formed in an apparatus and method for making long tapered or slow-fade banjo-shaped axle housings. The irregular shaped blanks are cut in a special shape as shown in FIG. 6 of the Schneider, et al patent and are hot forged into longitudinal, channel-shaped housing halves having the banjo-shaped differential-receiving region in the center and the tapering beams joined to the wheel spindles at each end. The blank is heated to about 1800° F. The hot forged blanks of irregular design are formed in several stages in dies to provide a circular banjo portion and a long tapered transition zone to the straight axle portions extending to the wheels. Channels of a U-shape are formed. The outer end regions of the channel walls are reduced in height to thicken the metal in the corner regions. The side walls are scarfed at a critical scarfing angle for welding. Each respective half of the banjo-shape axle housing is thus formed in a manner so that two halves will match. The aligned scarfed and mated edges of the U-shaped channels which are matched are then welded together at the scarfed edges.

A variety of sizes of slow fade or long tapered axle housings are commercially made from various sizes of blanks. These different sizes come with the axle arms of the same length or of different lengths so that the differential receiving opening may be centered or off-set to the right or to the left.

Radius Changes to Improve Schneider, et al, U.S. Pat No. 2,674,783

The present invention is directed to improvement in the torsional resistance of the banjo or differential receiving portion and to strengthening the taper or transition zone between the edge of the circle constituting the differential receiving portion and the axle beam arm portions of a drive axle housing which is otherwise similar to those produced in the Schneider et al process. In the long tapered gradual transition zone which is characteristic of the Schneider, et al product, the axial gradual transition zone distance from the center of the housing to the end of the radius, is about two times the radius $R_1$ defining the axially extending curvature of the corner sections of the housing and is characterized as a slow fade or transition of that radius $R_1$ and the radius $R_2$ defining the curvature of the web into the laterally extending beam arms. Thus the transition zone taper in the conventional manufacture extends along a relatively large distance which is substantially equal in distance to the radius $R_1$ of the banjo portion. For example, the gradual transition zone of a Schneider et al type of housing with a 9 inch $R_1$ radius of the banjo portion extends about 8 to 9 inches along the horizontal axis and terminates about 17 inches from the origin or center of the differential receiving portion of the housing. In contrast to this long tapered portion in the slow-fade which merges with the straight beam, the present invention cuts the fade in half. Thus in comparison with the prior art example of a 9 inch $R_1$ radius having a transition distance terminating about 17–18 inches from the center line passing through the center of the banjo or differential receiving portion, the length of the tapered portion or transition zone is reduced to about 40–48% of the $R_1$ radius in the present invention.

Differences of the Blank of the Invention Over the Blank in Schneider, et al, U.S. Pat. No. 2,674,783

The blank of strip material shown in the patent to Schneider, et al, U.S. Pat. No. 2,674,783 at FIG. 6 shows a number of significant differences in the longitudinal, vertical and internodal dimensions and relative proportions of the arms and nodal portions in comparison with the blank used in the present invention. For example; the width of the blank, i.e., the distance between the nodes in the Schneider, et al blank is 14 inches or about 14% wider than the maximum width or distance between the nodes in the blank of the present invention.

The Schneider et al blank of FIG. 6 is not only wider but a substantially greater length of that blank is dedicated to forming the differential receiving portion and transition zones than with the blank of the present invention. In the Schneider et al blank, about 71% of the length of the blank is dedicated to forming the differential receiving portion and transition zones while 29% of the length is used to form the beam arms at each end of the axle housing. In the blank of the present invention 48–50% of the axial length is dedicated to formation of the beam arms sections of the housing while 50–52% of the axial length is dedicated to formation of the differential receiving portion and transition zones of the axle housing.

Although the width of the blank of the present invention is less than the width of the Schneider et al blank the nodal slopes defining the contour of the top and bottom edges do not cut as deeply into the blank as the slopes of the Schneider et al blank. For example, excluding the depth of the notches and the nodal and node slope portions, the width of the remainder of the Schneider et al blank is about 66% of the maximum width across the nodes wherein the width of the corresponding remainder of the blank of the present invention is 70–71% of the maximum width of the blank. There is greater waste in the portions cut away to form the Schneider et al blank.

A further distinction resides in the nodal slopes per se. In the blank of the present invention, the inner nodal slopes are substantially steeper than the outer nodal slopes. There is no such significant difference between the inner nodal and outer nodal slopes in the Schneider et al blank.

A still further distinction arises from the plurality of notches 24 in Schneider, et al which are cut into the edge of the blank between the nodes at the top and between the nodes at the bottom which is much more complex in Schneider, et al than in the blank of the invention. In FIG. 10 of Schneider, et al, three such notches are shown in the side view of the formed blank and these three cut out notches on each long edge make six notches in total, three on the upper edge between the nodes and three on the lower edge registering with the upper notches. In contrast the present invention has only one notch on each long edge. The blank has only two notches total, which are positioned precisely to locate the opening for the entry of the differential ring gear.

From simple inspection of the drawings of the blank of the invention and the Schneider, et al blank, it is seen that the blank of the present invention both utilizes and wastes less metal than the Schneider et al blank. Moreover, as will be described more fully, the portion of the blank dedicated to forming the differential receiving portion and transition zones is subjected to a more complex and intense bending and hot forming operation which improves the strength and fatigue properties of the finished axle housing.

The movement of the metal dedicated to forming the differential receiving portion and transition zones of the housing is best accomplished in the invention by forming the blank first in the central area before forming the end portions. Thus the flat blank is curved in the center to form wings which extend on each side. This is a semi-formed half with flat wings which represents an intermediate stage of manufacture in the first step of the forming process of the present invention. The wing portions are bent into U-shape and these steps are accomplished in a single first bending operation which precedes a single sizing or straightening operation. Generally, the apparatus of Schneider, et al, may be used for these steps. The usual procedure of Schneider, et al, of heating the blank material to a temperature of about 1800° F. in order to maintain the proper temperature condition for bending need not be followed and it is preferred to operate at lower temperatures to reduce the amount of decarburization at the surface of the axle housing halves and reduce wear of the forming die material.

It is a characteristic of the method of the present invention that the forging operation is carried out in a highly intensive manner in several stages, including a first stage above 1350° F. for hot bending and a second stage where the walls are squared off and the corner radii are sharpened. The modified fast-fade area is carefully sized during formation of the banjo portion which takes place in the highly intensive first stage of bending and forming. The taper or transition of Schneider, et al, extends over twice the distance as compared with the extension of the taper or transition in the present invention. This requires highly intensive and accurate bending of the transition portion of the blank of the invention. The length of the transition zone along the longitudinal axis from the edge of the circle of the banjo is only about 45% of the radius $R_1$ in the present invention instead of 100% of the radius $R_1$ as in conventional axle housings produced by the Schneider et al process.

The present axles are "hot formed" i.e. bent in the die, and the blanks are heated to temperatures above 1350° F. and below about 2100° F., preferably about 1400°–1650° F. During forming the blanks are bent in the dies under conditions in which there is no attempt to move or displace the metal as in a hot forging operation conducted at temperatures greater than 2100° F.

There are essentially three different styles of axle housings, a first style in which both of the axle beam arms are of the same length with the bowl in the center, a second in which the left beam arm is shorter than the right beam arm and a third in which the left beam arm is longer than the right beam arm. In the drawings of the present invention the shorter left beam arm is shown as one example but the invention can be carried out with all three styles.

The present invention provides for lower inventory requirements for various blank sizes and blank styles (left, center or right) despite a higher working requirement in forming and bending and a significant increase in strength and resistant to breakage is achieved in the product.

The modified fast fade design of the present invention provides the following advantages:

1. Savings of metal for an axle of a specified load rating, i.e. less weight, less waste and less expense.

2. Stronger axle; even though less metal is used for the entire axle more metal is provided and structurally formed to increase the load carrying capacity of the transition zones and the area adjacent the transition zones over the load carrying capacity attained with other designs.

3. The axles are more easily packagable in the vehicle:

(i) fast fade minimizes width of curved differential receiving "bowl" portion and increases horizontal length of beam arms thereby providing greater lateral clearance for depending truck body frame members on each side of differential bowl, and (ii) increased length of beam arms permit location of truck suspension to axle brackets over a greater horizontal distance on each side of the differential bowl.

Characteristics of Modified Fast Fade

A new axle housing is provided by purposely forming a shortened banjo section thereby providing a transition zone only 40–48% as long as the transition zone in the conventional method. The short neck which results from a shortened transition zone from the circular portion to the beam arm portions of the housing is less than ½ that of the transition zones provided by conventional forging operations. Thus for a 9 inch $R_1$ radius of the differential receiving portion of the axle housing the transition zone extends only an additional 4 inches to where it blends smoothly into the bearm arms.

To describe the modified fast fade axle housing and the transition zone where the differential receiving portion blends into the beam arms, a first radius $R_1$ centered at the origin defines the locus of the center points of the radii ($R_c$) forming the corners joining the legs to the webs of each U-shaped section and a second eccentric radius $R_2$ measured from an eccentric point of origin O' defines the outer wall curvature or curvature of the web forming the outer wall of the housing, so that the distance between the true origin O and the eccentric origin O' and the length of the second radius are factors which reflect a substantial increase in displacement of the web or outer wall of the housing relative to the origin O about the center of the differential receiving portion of the axle housing. The 9 inch $R_1$ radius and 0.81 inch displacement of an eccentric radius of 10.50 inches provides an axle housing having outstanding strength and resistance to stress factors and of less weight in comparison to conventional axle housings rated for the same load carrying capacity which are produced using the long taper rather than the short taper or short transition zone. The corner radius is 0.62 inch at each end of the housing. The web or outer wall of the housing defined by the $R_2$ radius (10.5 inch) is blended into the web or outer wall of the beam section with a 5 inch blending radius and the locus of the corner radii defined by the radius $R_1$ (9 in.) is blended into the locus of the corner radii of the beam arms with a 2 inch blending radius.

The short throat transition rather than a long transition represents a substantial shortening of the taper in the throat portion of the axle housing and corresponding savings of weight and metal. The radially displaced web or outer wall provided by the eccentric radius $R_2$ and displaced origin O' increase the vertical dimension of the U-shaped channel from the horizontal center line through the transition zone and provide a greater load carrying capacity to that section of the axle housing. This is desirable since the circular apertures provided to each major face of the differential receiving portion of the axle housing are closed on one side with a bowl-shaped cover welded to the axle housing and on the other side with a differential carrier bolted to an annular ring welded to the axle housing. The continuous annular weld joints securing these members to the axle housing are structurally sound, however the stresses resulting from the thermal gradient at the radially outer periphery of the weld joint may reduce the load carrying capacity of a vertical section through that part of the housing by as much as 25%.

The deleterious effect of such a reduction in strength is overcome by the present invention where each vertical section through the radially outer zone adjacent the circular weld joint is increased in height, i.e. spaced outwardly from O and upwardly from the horizontal weld joint to insure that the load carrying capacity of each vertical section is greater than some predetermined value; e.g. greater than the load carrying capacity of the beam arms.

BRIEF SUMMARY OF THE INVENTION

Based upon the foregoing distinctions characterizing the novel blank of the present invention, the method of heating the blank at lower temperatures than in the aforesaid Schneider, et al patent and the special intensive bending in the arcuate neck section constituting the transitional zone between the differential receiving portion and the beam arms, left and right, there results a shortened neck portion, longer beam arm portions, a more complex curvature resulting from the modified fast-fade bending and a stronger axle housing than in the aforesaid Schneider et al patent.

An improved modified fast fade banjo-type rear axle housing having a shortened neck shape is formed in an intensive bending operation from a new blank to thereby maximize the strength of the differential receiving portion of the housing particularly adjacent to the zone where the expanded annular section joins the rectangular beam of the axle. This zone is the banjo transitional zone which is provided in a shortened taper which is about 40–48% smaller than the conventional taper of Schneider, et al, U.S. Pat. No. 2,674,783.

A first radius $R_1$ is measured from the true origin of the banjo to the centers of the corner radii of the U-shaped channel section and a second eccentric radius $R_2$ is measured from a displaced origin below the true origin. This displaced origin constitutes an eccentric point of origin to the outer wall and defines the outer wall or web in the channel shaped annulus of the banjo.

In creating the transition zone between the two oppositely extending beam arms of rectangular cross-section and the differential receiving portion which lies in the center of the drive axle housing, the curvature of the corner sections is defined by a plurality of corner radii $R_c$ each of which is struck in a plane normal to the outer surface of the web. The web is the wall of the drive axle housing which is joined to both legs of the U-shaped section by the arcuate corner sections. The axially extending convex curvature of the arcuate corner portions forming the differential receiving portion is defined by the first radius $R_1$ measured from the true origin O and the axially extending convex curvature of the web forming this differential receiving portion is defined by the second eccentric radius $R_2$ measured from a displaced origin O'. The displaced origin O' is located on the vertical axis of the differential receiving portion and is displaced from the true origin O in a direction away from the web.

Two further concave blending curvatures $R_3$ and $R_4$ define the concave blending curvature of the web, e.g. $R_3$ and of the arcuate corner sections, e.g. $R_4$.

The relationship of the second radius $R_2$ and location of the displaced origin O', is such as to gradually displace the axially extending convexly curved web outwardly relative to the true origin O which thus increases the radius $R_c$ of the arcuate corner sections as the axially extending convex curvatures approach the transition zone to increase the distance from the web in a direction which is normal or perpendicular to the horizontal center line and to increase the dimensions of the box section formed by the legs. In the transition zone the length of the blending radii $R_3$ and $R_4$ is substantially less than the corresponding radii used in drive axle housings in which the convex curvature of the web is concentric with the true origin O. As a result of the reduced length of the blending radii $R_3$ and $R_4$, respectively, the length of each transition zone is reduced and the load carrying capacity of the differential receiving portion is increased due to the increased dimensions of the box section of the housing half. This increase in load carrying capacity in the differential receiving portion and in each transition zone is designed by finite stress analysis to be far greater than the load carrying capacity of the beam arms.

The geometry of a drive axle housing of the type to which the present invention is directed inherently provides box sections in the transition zone which are larger and theoretically should be capable of a great load capacity than the beam arms of shorter vertical section. However, as pointed out previously, even with the best weld joint, the stresses resulting from the thermal gradient at the radially outer periphery of the weld joint may reduce the capacity of a vertical section through that part of the housing by as much as 25%. Stress analysis studies have shown that the minimum load carrying capacity of vertical sections through and adjacent to the transition zone of the prior art slow fade axle housings are typically between 5 and 6 times the load carrying capacity of the beam arms which would be satisfactory were it not for the potentially deleterious effect of the residual stress at the outer periphery of the ring weld joint.

Similar studies of axle housings in which the concave blending radii have been reduced with no compensating change in the convex curvature of the differential receiving portion and the transition zones of the axle housing have reduced the minimum load carrying capacity of vertical sections through and adjacent to the transition zone to a value between 4 and 5 and sometimes less.

In the present invention, the eccentric radius $R_2$ displaced from the true origin O moves the web wall of the axle housing radially outwardly to increase the vertical box sections and moment of inertia of those sections thereby increasing the load carrying capacity of each vertical section through the continuous annular weld joint and normal to the longitudinal or horizontal axis of the drive axle to a value greater than 6, the best minimum value obtained for conventional slow fade axle housings, and preferably in the range of 8 to 9, which has been achieved by the disclosed example of the present invention, so that any residual weld stress which may tend to reduce the load carrying capacity of a vertical section through the aforesaid portions of the axle housing would still be greater than the currently accepted design value before weld stress deterioration of 5 to 6.

The load carrying capacity of the box sections described above can be calculated in conventional manner by dividing the vertical moment of inertia of each section by the distance from the outer periphery of the annular weld joint of that section to the horizontal axis of the drive axle housing and then dividing that quotient by the vertical moment of inertia of one of the beam arms divided by the distance from the web of the beam arm section normal to the horizontal axis of the dive axle housing.

In the preferred embodiment of the invention the length of the blending radii $R_3$ and $R_4$ is less than one half of the length of the corresponding radii in conventional drive axle housings. In short, the $R_3$ and $R_4$ characterizes the modified fast fade so that the web rapidly blends concavely in each transition zone in an axial distance which is less than $\frac{1}{2}$ times the length of the first radius $R_1$ as measured along the longitudinal axis of the drive axle housing.

The shortened arcuate neck in the transitional zone tapers as defined by the above defined radii blending the corner radii and web of the outer wall of the differential receiving portion to the corner radii and outer wall of the beam arms constitute the modified fast fade in contrast with the conventional taper is shown in Schneider, et al, U.S. Pat. No. 2,674,783 which represents a slow taper or conventional fade.

Also, as explained above, the displaced outer wall and increased vertical section differential receiving portion of the rear axle housing adjacent the annular or circular weld joints increases the load carrying capacity of the axle housing resulting therefrom.

It is also possible to have two eccentric radii both displaced from a true origin and to have a fast fade created because of the blending radii in the arcuate neck portion being shortened substantially below the standard or conventional taper of the Schneider, et al U.S. Pat. No. 2,674,782. This is not the case of the present invention. The modified fast fade of the present invention uses one true radius $R_1$ and one eccentric radius $R_2$ and is thereby distinguished from the two eccentric radii type of fast fade design which is much more complex to execute in the preparation of and bending of the blank.

An important characteristic of the present invention lies in the shape and contour of the blank itself which is cut from standard steel stock and has unique features of height dimensions and internodal dimensions which differentiate it in almost every aspect along the longitudinal contours of the upper and lower edges of the present blank as compared with the blank in FIG. 6 of the above-mentioned Schneider et al patent. These shape characteristics of the Schneider et al blank can be simply expressed in length characteristics such as having a total node and internode dimension which is significantly greater than the total of the right arm and left arm length dimensions. In a typical example, a blank of the present invention has a left arm of 14 inches in length, a right arm 17.75 inches in length and the total internode and node length is 32.60 inches as compared with 31.75 inches total arm length. The manner in which the left and right nodes are cut out of the blank is another important aspect in this example in which the steel stock is ⅜ of an inch thick. The left and right outer node rises which represent the sloping edges between the maximum of the node and the left and right ends of the blank respectively, are about 4.1875 inches. A plateau of about 1.0625 inches represents the flattened top on both the left and right nodes. A long internode distance to the center line of 22.092 inches is provided consisting of 11.046 inches on the right and 11.046 inches on the left of the center line. The inner downwardly curved line, curving at a very slight slope instead of the deep cut in Schneider et al, FIG. 6 represents a characteristic internodal contour of the present blank which is best defined in terms of its vertical distances. In the left arm and in the right arm the width dimensions in the blank is 8.75 inches. This height dimension increases to a maximum of 12.25 inches between the plateaus of the nodes. On the inner nodal stretch of 22.092 inches there is a rather sharp drop from 12.25 inches in width at the maximum to a width of 9.25 inches in a distance of less than 2 inches, actually about 1.25 to 1.5 inch, toward the center line of the bowl. In short, the inner slope of the left and right nodes, i.e., inner nodal slope, is twice as steep as the outer nodal slope extending towards the left and right ends of the axle. The contour then drops only slightly from a width of 9.25 inches to a width of 8.6875 inches adjacent the formation of a slot, which is a single slot, having a width of only 7 inches. The slot is positioned slightly to the right of the center line of the bowl.

The significance of these shallow changes in width as compared with the much deeper and sharper changes in the FIG. 6 blank of Schneider et al results in less waste and more efficient use of the metal in the left node rise and right node rise portions which are bent to form the differential receiving and transition zone portions of the axle housing.

The different shaped, modified fast fade axle housing, of the present invention has demonstrated a substantial improvement in service life, both anticipated and actual, over the slow fade housing of the Schneider et al patent. The improvement is particularly significant in avoiding stress related fractures in the vicinity of the ring weld joint where the transition radius of curvature joins the bowl to the left and right beam arms of the axle.

BRIEF DESCRIPTION OF THE DRAWINGS

FIG. 16 is a plan view of the blank of FIG. 13.

BRIEF DESCRIPTION OF THE PREFERRED EMBODIMENTS

Figure 2:
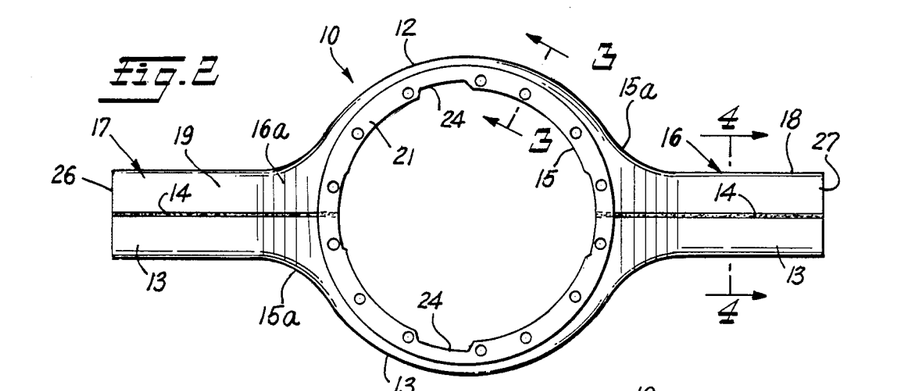
FIG. 2 is a front elevational view of the axle housing of FIG. 1.

The modified fast fade drive axle housing center section fabricated according to FIG. 2, comprises an upper half member 12 and a lower half member 13 as shown in FIG. 2 both of which are channel shaped in cross-section along their entire length, the channels being in the form of a U shaped cross-section having rounded corners and being substantially rectangular. The axle housing center portion is constituted by the banjo half portions in each of these upper and lower half members 12 and 13. The regions of the axle which serve to support the axle housing structure on the springs of the vehicle define the spring seat regions 16 and 17 (see FIGS. 2 and 4) and pad members are provided (not shown) which engage the springs and serve to mount the axle housing on the springs, one at each side adjacent the rear wheels of the vehicle.

Each of the ends of the axle housing center section 10 is planar and terminates in the surfaces 26 and 27 which are parallel to each other and which are perpendicular to the longitudinal center line of the housing. A sleeve boss 28 of cylindrical shape is formed at the outer end of the axle and a coupling (not shown) having a generally rectangular cross-section which is substantially the same size and shape of the adjacent surface 26 or 27. These adjacent matching surfaces are butt welded to each other at each end of the axle housing center as shown in FIG. 1 and the terminating structures 26, 27, etc. are conventional and well known.

Figure 1:
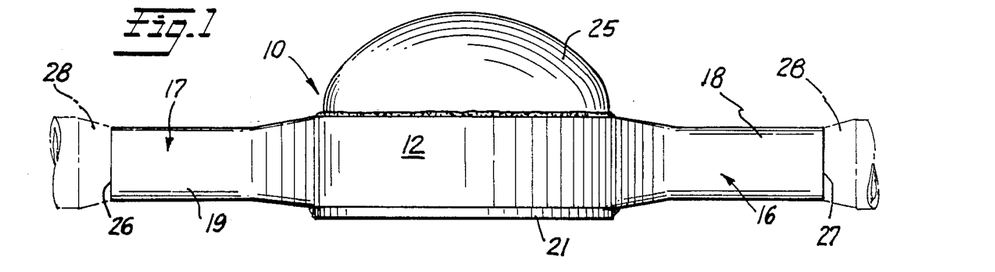
FIG. 1 is a top plan view of the drive axle housing of the present invention.
Figure 3:
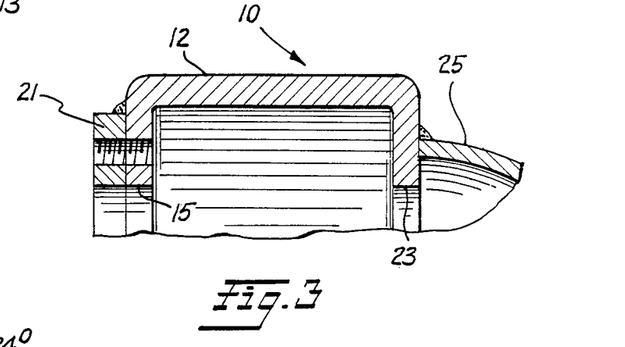
FIG. 3 is an enlarged fragmentary vertical sectional view, through the carrier ring.

As shown in FIGS. 1 and 2, the axle housing center section 10 of the finished axle housing comprises a differential receiving opening 15 which is located in the radial or banjo portion and is flanked on both sides by the left beam arm 19 and the right beam arm 18. Both the left beam arm 19 and the right beam arm 18 which are part of the upper half of the axle housing are illustrated in a form in which the left arm 19 is shorter than the right arm 18 but it is within the scope of the present invention to have the right arm the same length as the left arm, e.g. arms 19 and 18 being equal in length or to have the left arm longer than the right arm with the result that the differential receiving opening 15 is displaced either to the center when the arms 18 and 19 are equal in length or to the left rather than the right as shown in FIG. 1. The differential receiving opening 15 is closed on the upper base of FIG. 1 by means of bowl or cover 25 which is welded to the wall of the axle housing as shown in FIG. 3. A ring 21 is secured to the opposite side of the differential receiving opening 15 by welding as shown in FIGS. 1 and 3.

Circular openings for attaching the differential carrier are provided in the differential receiving region 15 and peripheral notches 24 are also provided in the differential receiving region 15 as shown in FIG. 2. These openings and notches constitute the inner periphery of the flange 21 which accommodates entry of the differential carrier and of the gears which are used for driving the vehicle. A steel closure bowl or cover 25 is welded to one side of the housing adjacent the opening 23. This welded cover 25 adds structural strength to the axle housing.

A preferred high strength sheet steel stock is used for the blank of FIG. 16 and the center section 10. The metal composition may be that which is used in Schneider, et al, U.S. Pat. No. 2,674,783, known as S.A.E. 1035 steel however, S.A.E. 1022 is preferred. This steel is a known high strength steel particularly useful in the production of axle housings.

The blank B of FIG. 16 is cut from SAE 1022 Mod steel is made from a strip which is about 65 inches long and about 13.25 inches wide at the opposite nodes. The blank B in FIG. 16 is formed from thicknesses of the preferred steel varying from at least $\frac{1}{8}$ inch in thickness up to about $\frac{7}{8}$ inch in thickness but preferably from $\frac{3}{8}$ inch up to $\frac{5}{8}$ inch in thickness. In the example of the present invention, i.e., a 9 inch radius of differential receiving region, the blank B has a thickness of $\frac{3}{8}$ inch, a width (w) of 13 inches, a length of 65 inches and an internodal distance of 34 inches which is about 52% of the total longitudinal dimension of the blank, e.g. the horizontal length L of the blank.

The offset at the bottom edge of the blank B is provided to permit a clamping means to hold the bottom edge of the sheet along its entire length L so that the minimum width of the offset is twice the thickness, e.g. twice $\frac{3}{8}$ inch or $\frac{3}{4}$ inch.

The cut of the blank provides a left beam arm portion having a length (a) of 14 inches, and a right beam arm portion having a length (b) of 17.75 inches and with the remaining center part of the length L being the internode length (INL) and the node length ($N_cL + N_dL$) which totals 32.60 inches. The left and right arm portions are each 8.75 inches wide as represented by the legend (h).

The left node portion of the blank B shown in FIG. 16 is identified by the left node rise (e) which continues from the left arm portion to the maximum height of the left node (c). At the right side of the blank B there is a right node rise (e) representing the sloping curve from the right arm portion of the blank B to the top of the right node (d).

The dimensions represented by $N_cL$ and $N_dL$ are 5.25 inches respectively which includes the axial extent of the nodal rise (e) and the top of the nodes which are flattened as a plateau designated by the legend (p) and extend for an axial distance of 1.0625. The internode length (INL) is 22.092 inches.

The maximum width dimension of the blank B is 12.25 inches and, as represented by the legend (j), occurs between the plateaus of the nodes (c) and (d) on the top edge of the blank and the oppositely aligned plateau of the nodes (c) and (d) on the bottom edge of the blank B.

The contour of the top and bottom edges of the blank B extending from the nodes (c) and (d) inward toward the center of the blank converge quickly over an axial distance of less than 2 inches adjacent each respective node to a width (K) of 9.25 inches and then gradually converge further to a width (m) of 8.5625 inches adjacent the notch 24 at the centerline of the blank B.

An important characteristic of the inner nodal slope of the modified fast fade axle housing blank of the present invention is that the inner slope (f) of the blank at the left and right nodes (c) and (d) respectively, is twice as steep as the outer slope (e) of the left and right nodes which extend outward toward the left arms and right arm portions of the blank B. The inner nodal slope (f) from the left and right nodes respectively toward the center line of the blank B represents a totally different contour than the contour shown in the FIG. 6 of the aforesaid Schneider et al patent in which the inner slope is about the same as the outer slope and extend more deeply into the width of the Schneider et al blank than the inner nodal slopes of the present invention. Excluding the depth of the center notches in each blank, the minimum width of the Schneider et al blank adjacent the notch is about 9.25 inches and the minimum width (m) of blank B adjacent the notch 24 is about 70% of (j) whereas the minimum width of the Schneider et al FIG. 6 blank is about 66% of the distance between the opposite node plateaus.

The slot formation which is positioned slightly to the right of the center line of the bowl, e.g. the differential receiving opening 15, has the minimum height dimension (s) for the entire blank and this dimension is about 7 inches. After the bending operation resulting in the formation of the U-shaped channel sections in the upper and lower halves respectively, 12 and 13, a correlation will be appreciated for the shallow internodal changes and the single slot formation of the blank which carries over through the bending operation to characterize the transition zones in the expanded annular section and the semi-circular edges of the differential zone 15 as these are illustrated in FIGS. 1 through 7.

Figure 4:
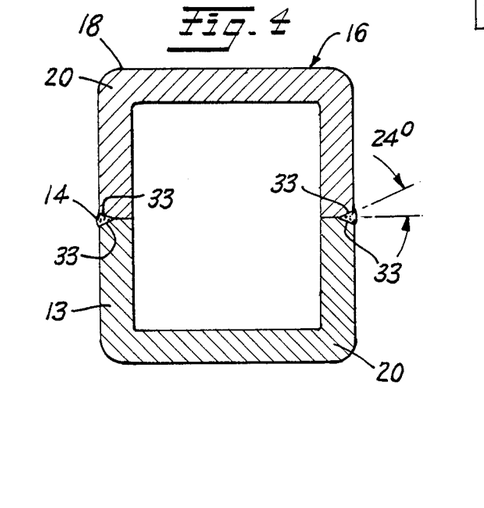
FIG. 4 is a vertical sectional view, through the spring seat area of the axle housing, taken on the line 4—4 of FIG. 1.

A commercial embodiment of a modified fast fade drive axle housing center section 10 fabricated according to the invention is shown in FIG. 1 for a 9 inch radius comprises an axle housing center section 10 formed of upper half member 12 and lower half member 13, each of which has a substantially identical U channel shape in cross-section with the abutting adjacent side wall portions welded together along weld line 14 as shown in FIGS. 2 and 4. The banjo portion which forms the differential receiving opening 15 at the center of the axle housing provides one surface which is flat and secured to a ring 21 while the opposite flat surface is secured to the bowl 25. The bowl 25 is shown in the upper face of the banjo in FIG. 1 while the ring 21 is welded to the lower face. The longitudinal arms of the axle 18 as shown in FIG. 1 extend on both sides, to the right as shown by reference numeral 16 and to the left as shown by reference numeral 17. The very end of the U-shaped cross-section of each arm 17 and 18 is connected to a flanged wheel assembly (not shown).

The inner joining portion of the flanged wheel assembly constitutes an outwardly flared section which joins the rectangular cross-section to the flange following which there is a welding of the spindle section of the circular cross-section represented by a circular step member fitted to the wheel hub bearing assembly. The flange portion which connects the axle housing to the wheel spindle assembly is conventional and is not shown in FIGS. 1 and 2 herein, nor is it shown in the views of the invention embodied in FIGS. 5, 6 and 9.

In the internodal spacing of the blank at the upper and lower edges of the blank B as shown in FIG. 16, there is only one slot 24 in the upper edge and only one slot 24 provided in the lower edge. Note the location of these opposite slots in comparison with FIG. 7 of Schneider, et al, U.S. Pat. No. 2,674,783 which illustrates a plurality of slots and notches including one large slot 24 and two smaller notches in each edge to give a total of 6 in all.

Figures 9, 10:
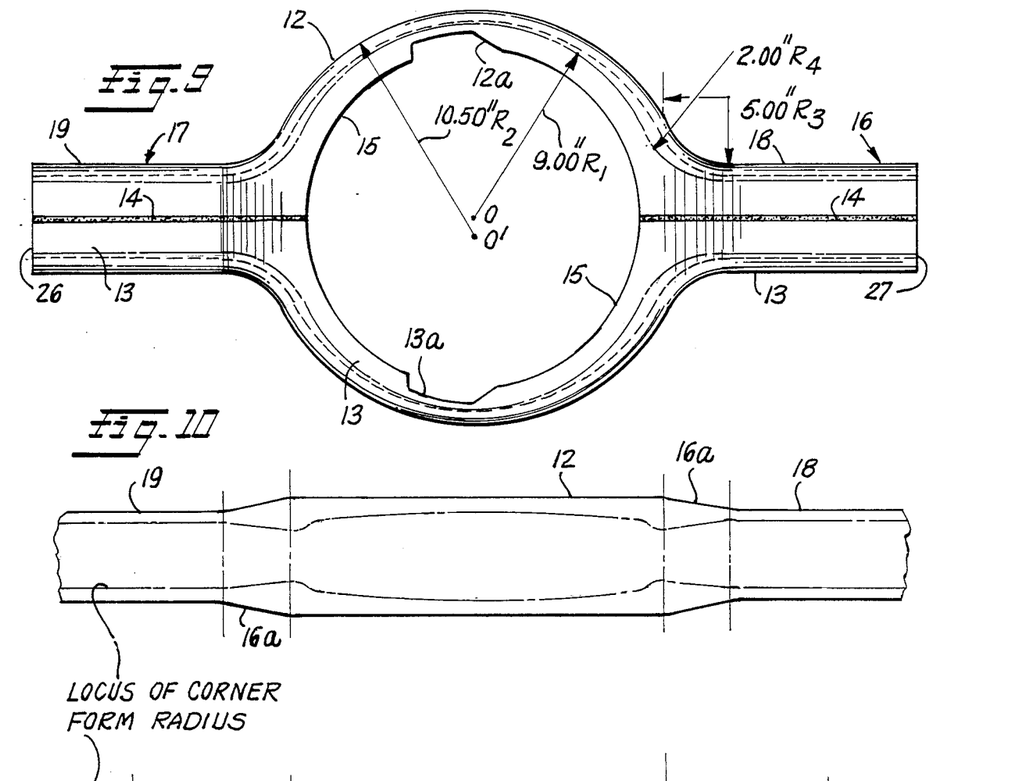
FIG. 9 is an enlarged front elevational view similar to FIG. 2, without the carrier ring.
FIG. 10 is an enlarged diagrammatic fragmentary view of the center section of the housing showing the locus of the corner form radius of the fast fade housing according to the invention.
Figure 11:
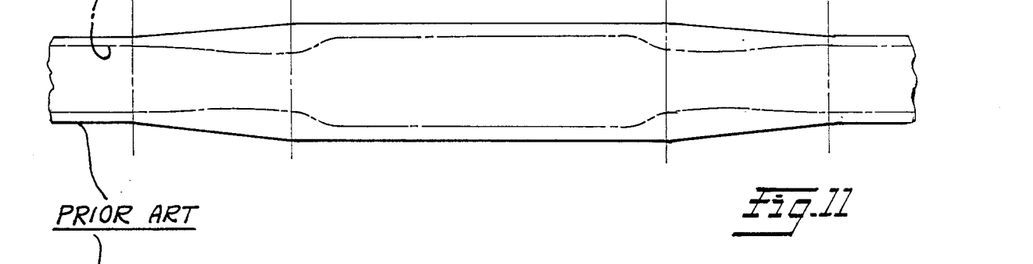
FIG. 11 is a view, similar to FIG. 10 but showing the locus of the corner form radius of the prior art.
Figure 12:
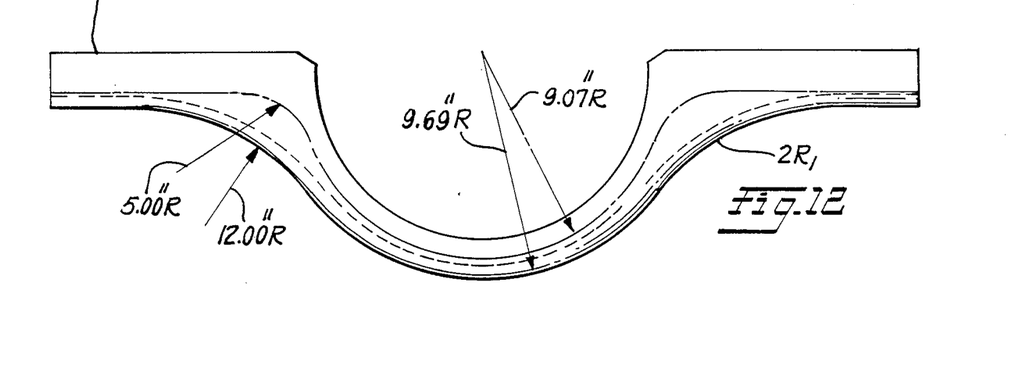
FIG. 12 is a front elevational view of the lower section of the axle housing of the prior art.

The long taper or slow fade in Schneider et al is measured from the point of origin in the center section between the vertical axis and the horizontal axis of the axle to the boundary of the neck on the horizontal axle. To permit a better appreciation of the slow fade attention is invited to the present drawings in the views of FIGS. 10 and 11. FIGS. 10 and 11 provide a comparison of the difference in length of the transition zones of a conventional "slow fade" axle housing as shown in FIG. 12 with the modified fast fade of the axle housing of FIG. 9.

The legend "locus of corner form radii" in FIG. 10 shows a feature of the present invention which is similar in presentation to that of the prior art FIG. 11 representing the slow fade of Schneider, et al, but in which the fast fade is represented not by the taper but by the locus. A locus of corner form radius is defined as the set of points along the length of the axle which are the center of the radii which form the fillet at the external corner of the axle housing.

In the present invention the cross-section is U-shaped for each half and the two halves are welded together as shown in FIG. 4. Thus at the section line for the right longitudinal arm 16 the top arm half 16 is welded to the bottom arm half 19 by means of the fillet weld 14 which is applied to the stoved edge 33 at each of the halves. The angle at the stoved edge 33 is about 24° which is substantially greater than the angle in the edge shown in FIG. 14 of Schneider et al, U.S. Pat. No. 2,674,783.

Figures 5, 6, 7, 7A, 7B, 7C, 8:
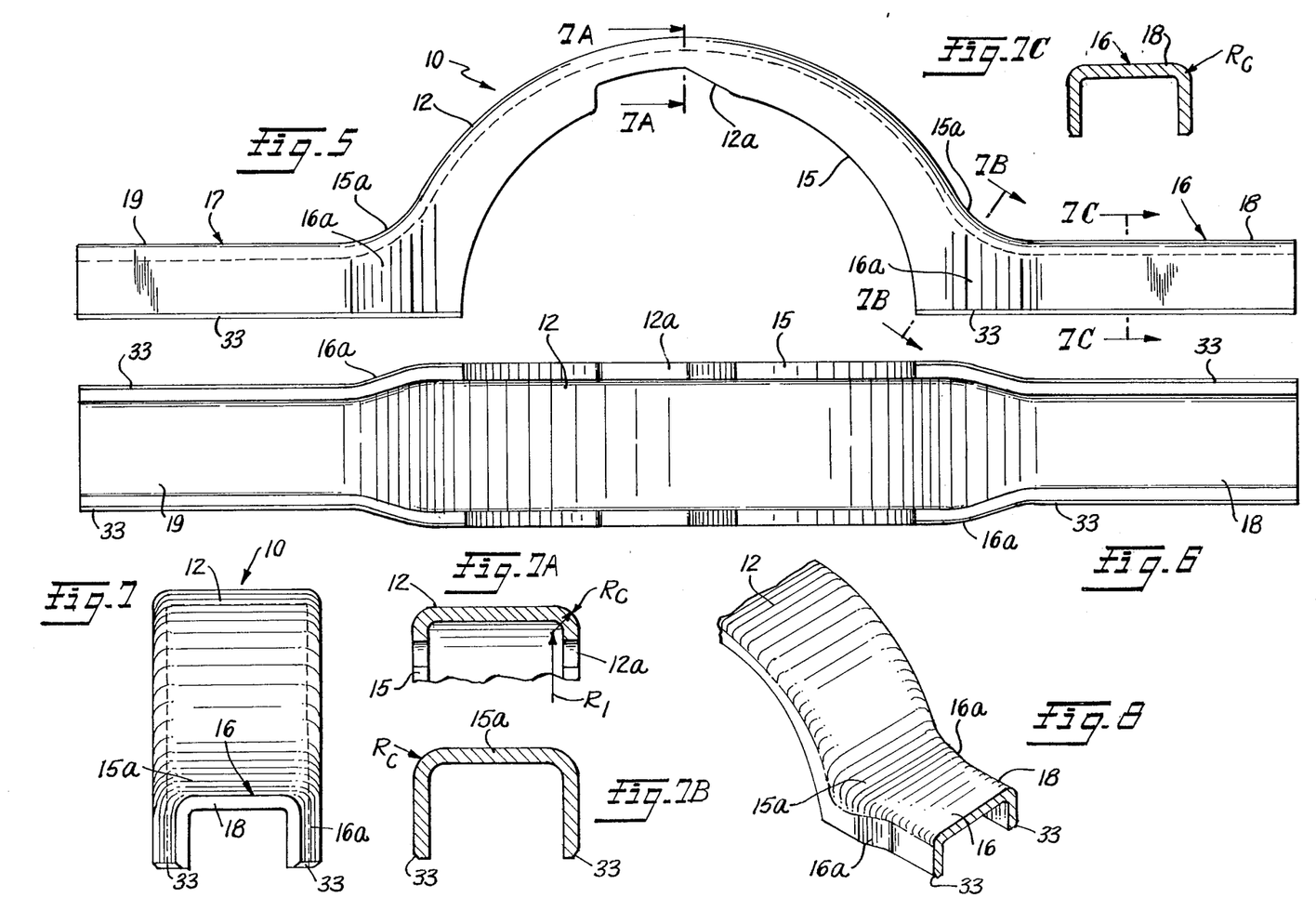
FIG. 5 is an enlarged front elevational view of the upper section of half of the axle housing member.
FIG. 6 is a bottom view of the axle housing of FIG. 5.
FIG. 7 is an end view of the upper section of the axle housing as viewed from the right of FIG. 5.
FIGS. 7A, 7B and 7C sectional views taken along the corresponding lines in FIG. 5.
FIG. 8 is a fragmentary isometric view showing the offset fast fade area between the bowl and spring seat section of the axle housing.

The fast fade transition which is illustrated in the formed housing member in FIGS. 7, 7A, 7B and 7C provides an indication of the complex curvature in the fast fade area 15a shown in FIGS. 7 and 8 and the curvature at the sides shown in the offset area 16a and the joining area where this transition area which is the offset area 16a merges into the beam arm wall 18.

The cut out in the differential receiving opening 15 represented by notch 24 represents the main wall dimensions through which section line 7A—7A has been taken and this specific notch location in FIG. 7A should be compared with the notch formation shown at 24 in the blank B of FIG. 16.

It is constructive to compare the plan view of the blank of the blank of FIG. 16 in side by side comparative relation with FIGS. 7, 7A, 7B, 8 and 5. These Figures illustrate that in each of the critical bending areas of the blank; the transition between the arms of the beam and the nodes as well as the transition from the nodes to the center line notch 24, that bending of the metal which changes the dimensions of the bottom of the U as well as the curvature at the side walls of the U-shaped sections provide a combined bending and forming operation which results in a much more complex U-shaped section characterized by a fast fade, a varying web wall height and a varying web wall curvature with the last curvature feature being one of the most characteristic aspects of the fast fade bending operation.

Referring to FIG. 8 the transition region at reference numeral 12 results from bending of the stock material of the blank B to create the semi-circular banjo portions of the two halves 12 and 13.

In FIG. 9 the first radius $R_1$ is 9.00 inches, $R_2$ the eccentric radius is 10.50 inches and the displacement from the origin O is 0.81 inches. The abrupt change in the transition zone is characterized by the term "modified fast fade" since the blending radii external of the transition zone and illustrated by the legends 2.00R for $R_4$ and 5.00R for $R_3$ respectively, define the shortened transition zone in the concavely curved transition areas. The change in the curvature is defined by $R_1$, $R_2$, $R_3$ and $R_4$ respectively. The eccentric radius $R_2$ provides the parameters which describe the curvature measured from a eccentric point of origin O' which is displaced directly from the true origin O. The remaining parameter which defines the modified fast fade in comparison to the current slow fade which is shown in FIG. 12 is the distance between the edge of the banjo circle opening after welding to the boundary where the straight arm of the axle left or right, joins the curved transition zone. In the modified fast fade axle, this distance is ½ the distance of that in the current production, e.g. with a 9 inch value for $R_11$, the inner radius, the additional distance to reach the axle arm boundary for straight line projection is 4 inches, e.g. roughly 44% of the inner radius. The shortened distance may vary from about 44–55%.

Reference is made to FIGS. 5, 6, 7, 7A, and 7B showing the deformation of the outer circular cylindrical area of the banjo to form a narrower U-shaped section in the half 16. The hatching lines and shading lines in FIGS. 7, 7A and 7B reflect the simultaneous narrowing of the corner where the metal is squeezed inwardly and deformed downwardly to provide the complex deformation which takes place because of the inward squeezing of the metal in the offset area of the fast fade bend 15a which is designated by the offset are 16a in FIG. 8. If one were to compare FIGS. 7 and 7A herein with FIGS. 8 and 12 of Schneider, et al, one would note that the inward stoving which occurs along the longitudinal axle portion in Schneider, et al occurs instead within the fast fade area of the present invention so that there is a substantially greater amount of metal working operation required in creating the new structure shown in FIGS. 7 and 8 herein. Further, this increase in metal working in the fast fade area which creates the offset area 16a requires that the locus of corner form radius makes the change within a much shorter distance in the embodiment of the modified fast fade of the present invention than in Schneider, et al.

Figures 13, 14:
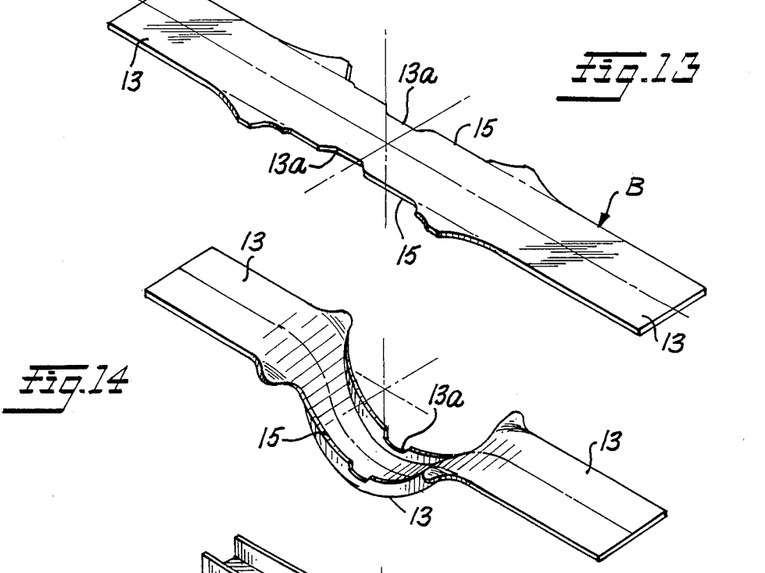
FIG. 13 is a perspective view of the blank used to form the drive axle housing of the present invention.
FIG. 14 is a perspective view of the blank of FIG. 13 as it is partially formed during the first stage of bending.
Figure 15:
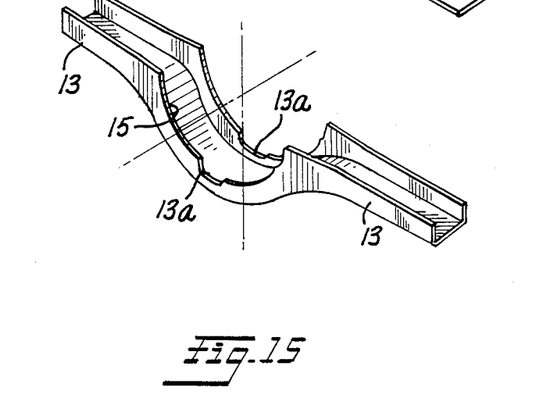
FIG. 15 is a perspective view of a section of the axle housing of the present following the first stage of bending.

The process of manufacture of the fast-fade banjo portion is carried out in two stages, the first stage being the hot forming of the blank which is shown in FIGS. 13 and 16 by heating the blank to a temperature of 1350° F. to 1650° F. in a suitable commercial furnace or induction coil after which the center portion is formed in dies similar to the Schneider, et al dies which permit the wings of the blank on the outsides of the internodal portion to remain flat during the first part of forming as shown in FIGS. 13 and 14. In the first part the semi-circular form is achieved and the sides are then formed in the second part of the first forming as shown in FIG. 15.

In the second part of forming, the corner radii are decreased in the dies, the weld angle is stoved and the gear notch clearance is pressed in the final form of FIGS. 8 and 9. Mere inspection of the shading in FIG. 9 shows that the joining lines between the rectangular half sections comes much closer to the differential receiving opening. Since FIGS. 9, 10, 11 and 12 are all in the same relationship with respect to the fast fade area and slow fade area, the longitudinal beam arms extend further towards the banjo in the housing of the present invention at the weld line than in the case in the prior art of FIG. 12 showing conventional fast fade with blending radii of 5 inches and 12 inches.

Thus the bending and stoving operation forming the U cross-section takes place within the bending dies similar to the apparatus of Schneider, et al but the blank is different and the bending is carried out in an entirely different manner in the transition area to strengthen this area in a special sub-sequence of bending and forming being performed at the differential receiving region to create the U-shaped portions at the center of the blank B before the arm portions 16 and 17 have been bent.

Reference is now made to FIG. 8 which shows a fragmentary isometrical view of the fast fade radius 15a and FIG. 10 which bears the legend for the "locus of corner form radius". In particular note that the fast fade radius 15a at the juncture between the inner portions of the banjo where the $R_1$ radius sweeps the inner surface and shows an edge dimension of this fragmentary part in which an inwardly offset area 16a is provided. The "locus of corner form radius" is shown as a dotted line which in general is parallel to the inner wall $R_1$ radius until the maximum change in curvature occurs in fast fade area 15a and there is a simultaneous narrowing in the offset area 16a. The right hand edge of 15a is the boundary at the edge of the rectangular axle beam arm 16.

Turning now to FIG. 10, the maximum locus displacement which is shown in the first vertical line passing through the opposite nodes at the top and bottom in the view of FIG. 10 represents another view of fast fade area 15a. The placement of this vertical line is adjusted in views of FIG. 10 and of FIG. 11 to correspond to the placement of the corresponding line representing the locus of the corner form radii of the prior art shown in FIG. 11. The vertical line to the left of the nodal line demonstrates the boundary at the end of the modified fast fade area where it merges with the axle arm 16 or 17. This boundary vertical line shown in FIG. 10 is spaced a distance from the nodal vertical line which is less than one-half the spacing corresponding to the second line in the FIG. 11 view of the prior art. Thus the respective spacings between the vertical lines in FIGS. 10 and 11 comparatively demonstrate the axial or horizontal length of modified fast fade and slow fade respectively. FIG. 10 is shown in relation to the isometrical view of FIG. 8. By viewing FIGS. 8, 10 and 11, an entirely different comparison is seen for the differential receiving region 15 in the invention than in the Schneider, et al, patent.

The curvature in the modified fast fade area 15a is represented in FIG. 9 by the blending radii, $R_3$ and $R_4$. For the example in FIG. 9 which is a 9 inch $R_1$ inner radius value and a 10.5 inch $R_2$ eccentric radius value, the inner blending radius $R_1$ at 15a is 2 inches while the outer blending radius $R_3$ is 5 inches.

The radii in the prior art shown in FIG. 12, where the inner blending radii for the corners is 5 inches and the outer blending radius for the web wall is 12 inches. The differential receiving housing is substantially the same dimensions, e.g. the inner radius $R_1$ is 9.07 inches and the radius from the true origin to the outer surface is 9.69 inches.

It is a characteristic of the present invention that the welding operation employs a fillet 14 which joins the U-shaped halves shown in FIG. 4 at the fillet angle 33 which is shown as being 24° to provide a deeper filet 14 and a welding line which extends beyond the transition zone to the receiving opening 15.

Reference is made to the method of fabrication shown in Schneider, et al, U.S. Pat. No. 2,674,783, and in particular to the description of the forging of the axle housing member at Columns 5 through 8 of the patent. The method of the present operation distinguishes over the first cutting operation which forms the blank of a larger sheet of metal to produce the improved blank B of the contour shown in FIG. 16 in that the blank of the present invention utilizes and wastes less metal than the larger sheet metal blank of Schneider, et al and provide a lighter axle for equivalent load rating.

The first stage after cutting of the blank is to heat the blank to 1350°–1650° for 20 minutes in a suitable furnace or 1.5 minutes in an induction heater and then to place the blank in a special assembly in which the first bending takes place in the banjo and leg areas of greater corner radii and then the blank is restructured longitudinally for the intermediate arcuate differential receiving portion and given a generally transverse U-shaped form. After this, the second form sharpens the corner radii, presses in the weld storing angle and presses in the gear notch clearance.

In this next step for forming the axle portion, the sides are formed by stoving them inwardly. These first two stages are most critical in the hot forming and bending operation of the invention for the reason that the banjo portion in the fast fade transition zone is pressed simultaneously downwardly and inwardly to form the taper which is completed at the zone or at the line of the arm extensions of the U-shaped axle housing and specifically along the bottom thereof, where the axle housing maintains the precise narrow base of the rectangular half portion for the remaining long dimension of the axle arms. This forming stage for the arms occurs simultaneously with the blanking of the banjo portion. Note that these axle beam arm portions have a lesser width than the banjo width and that the flange of the banjo is relatively narrow. The effective dimensions of the rectangular cross-section formed by welding the U-shaped halves together at the arms 16 and 17 is one in which the base of the rectangle has a smaller dimension than the height which makes the bending operation difficult and for this reason requires several stages.

The breakdown operation in Schneider, et al, is essentially a plate bending operation with a large cut out in the blank. In the present invention there is simultaneously carried out a much more intensive bending in more than one dimension and a narrowing by use of a coacting die and punch apparatus which determines the shape from the die configuration and confines the partially shaped blank from a first to a second and subsequent stages of bending. The arrangement of the coacting die and punch apparatus is such that the bending occurs in several planes and in the event that the blank cools unduly the blank must be removed from the apparatus, reheated and then returned to the beginning of the staged bending and pressing operation from which it is removed in order to obtain the precise form of the modified fast fade taper which is required.

In the example given of the 9 inch $R_1$ value for the inner radius and a 10.5 inch $R_2$ value for the eccentric radius, the distance between the edge of the inner circle, e.g. the 9 inch circle and the boundary at the end of the short taper is an additional 4.0 inches, e.g. less than ½ of $R_1$ for the taper extension. In the conventional slow-fade transition zone which is obtained in Schneider, et al, this distance is between 8 and 9 inches, e.g. the slow fade taper is about 8 to 9 inches long. The total distance from the true point of origin, O, to the boundary in the slow fade or conventional taper is 17.0 inches as compared with a total distance of 14.0 inches in the fast fade embodiment of the invention.

The finishing operation requires careful inspection of the above mentioned fast fade dimensions in a final forming operation in which the hot forming operation must achieve the prescribed dimensions in the banjo portion and the uniform thickness for the uniform axle portion, the short fade portion being stoved inwardly in a symmetrical configuration as shown in FIG. 8 and the more widely flared banjo portion which is also best seen in FIG. 8. The dimensions for the inner radius, $R_1$, and eccentric radius, $R_2$, are shown in FIG. 9 and these dimensions relate to FIGS. 8 and 16 for a working and operating example using these values for the inner shape of the differential receiving region which is apparent in the finished product and in the blank.

These disclosed characteristic values of the example of the invention, a 9.0 $R_1$ value with 10.50 value for $R_2$, a 2.00 $R_4$, 5.00 in $R_3$ of the corner radius to the outer surface of the bend. These values are shown in FIG. 9 herein. In contrast, the values shown for the prior art of FIGS. 11 and 12 are a 9 inch $R_1$, 9.69 inch $R_2$, a 5.00 $R_4$ and a 12.00 $R_3$ at the outer wall. These values of the radii in the two cases of modified fast fade and slow fade, respectively demonstrate convincingly that the concave blending radii in the conventional slow fade or long taper are more than twice the length of the concave blending radii in the modified fast fade transition zone of the present invention.

It is obvious that the bending which takes place in the enlarged annular banjo portion shown in FIG. 9 is far more intensive because metal is displaced in the transition zone radially further outward from the origin O in the FIG. 9 embodiment of the present invention than in FIG. 12 which represents the prior art. Thus there is a more highly tapered aspect and a steeper dimension adjacent the circular flat area constituting the flange portion of the banjo in the embodiment of the banjo form shown in FIG. 9 than there is in the prior art embodiment shown in FIG. 12.

In most axle housings it is customary to provide attaching means on the right and left beam arms 16 and 17, respectively, to secure the axle to the springs of the vehicle. Such attachment means are not shown since they are not part of the novelty of the invention. Nevertheless, reference is made to Williams, U.S. Pat. No. 3,015,238, which illustrates a pad 26 adjacent the spindle flange for engaging the springs of the vehicle which are located close to the wheels and a similar pad may be adapted for the present axle. Note that the spring seat regions of the tubular axle arms 17 and 18 are rectangular with the longer sides being vertical and with the upper and lower sides being horizontal. The flat horizontal surface of axle arms 17 and 18 eliminates the need for any special design of the spring pad and permits the use of attaching U-bolts or equivalent. The rectangular cross-section of both longitudinal axle arms makes it unnecessary to drill any holes in the axle housing and helps to maintain the strength of the housing where the rectangular cross-section comes into contact with the springs.

The invention may also be embodied in other specific forms without departing from the spirit or essential characteristics thereof. The foregoing description is therefore to be considered as illustrative and not restrictive the scope of the invention being defined by the appended claims.

What is claimed is:

1. A modified fast fade drive axle housing comprising:
    a differential receiving portion of generally convex outer curvature in an axial direction having two open side faces with an aperture of semicylindrical shape in each side face thereof providing a circular opening when two such portions are joined;
    two circular members each secured to an annular zone adjacent each side aperture;
    two oppositely extending beam arms of rectangular cross-section and a transition zone intermediate each of said beam arms and said differential receiving portion;
    said drive axle housing formed by welding half-sections of substantially U-shaped cross-section together along a horizontal center line of said housing and by securing said circular members to the differential receiving portion on each side face;
    at least one of said circular members being secured by a weld joint between the radially outer edge of said member and the contiguous side at said differential receiving portion;
    each of said U-shaped half sections comprising a pair of substantially parallel side walls which are joined by arcuate corner sections to the semi-cylindrical walls of the differential receiving portion, the curvature of said corner sections being defined by a plurality of corner radii ($R_c$) each of which is struck in a plane normal to the outer surface of said differential receiving portion of the drive axle housing and the walls of the beam arms;
    the axially extending convex curvature of said corner sections forming the differential receiving portion being defined by a first radius ($R_1$) measured from a true origin O at the intersection of the vertical axis of the differential receiving portion and the longitudinal axis of the drive axle housing;
    the axially extending convex curvature of the web forming the differential receiving portion of said axle housing being defined by a second eccentric radius ($R_2$) measured from a displaced origin O′;
    said displaced origin O′ being located on the vertical axis of the differential receiving portion and displaced from O in a direction away from the side walls of said differential receiving housing;
    said axially extending convex curvature of said arcuate corner sections defined by said first radius $R_1$ and said side walls of said differential receiving housing defined by said second radius $R_2$ respectively blending concavely in each transition zone into the corner sections and planar outer walls of said rectangular arm beams;
    the concave blending curvature of said web being defined by a blending radius ($R_3$);

the concave blending curvature of said arcuate corner sections being defined by a blending radius ($R_4$);

said second radius ($R_2$) and the location of said displaced origin O' being selected to gradually displace said axially extending convexly curved walls outward relative to origin O thereby increasing the radii ($R_c$) of said arcuate corner sections as said axially extending convex curvatures approach said transition zone to increase the distance from said curved walls normal to said horizontal center line and the dimensions of the box section formed by said arms, said arcuated corner sections and said curved walls through said transition zone and the length of said blending radii ($R_3$ and $R_4$) being less than corresponding radii used in drive axle housings in which the convex curvature of the web is concentric with the true origin O to reduce the length of said transition zone thereby increasing the load carrying capacity of the differential receiving portion and each transition zone relative to said beam arms and increasing the axial length of said beam arms, and the length of said blending radii ($R_3$ and $R_4$) being less than one-half the length of said corresponding radii.

2. The improved drive axle housing defined by claim 1 wherein said axially extending convex curvature of said arcuate corner sections and said web rapidly blends concavely in each transition zone in an axial distance less than one and one half times the length of said first radius ($R_1$) from the origin O as measured along the longitudinal axis of said drive axle housing.

3. The improved drive axle housing defined by claim 1 wherein said substantially U-shaped cross sections are bent from steel blanks of substantially uniform thickness between $\frac{3}{8}$ and $\frac{5}{8}$ inch thick.

* * * * *